US007761587B2

(12) United States Patent
Kim et al.

(10) Patent No.: US 7,761,587 B2
(45) Date of Patent: Jul. 20, 2010

(54) APPARATUS AND METHOD FOR TRANSMITTING PACKET IP OFFLOAD

(75) Inventors: Dae-Won Kim, Daegu (KR); Kyoung Park, Daejon (KR); Sun-Wook Kim, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 686 days.

(21) Appl. No.: 11/607,506

(22) Filed: Nov. 30, 2006

(65) Prior Publication Data

US 2007/0127485 A1 Jun. 7, 2007

(30) Foreign Application Priority Data

Dec. 1, 2005 (KR) ...................... 10-2005-0116131
Jun. 2, 2006 (KR) ...................... 10-2006-0050043

(51) Int. Cl.
*G06F 15/16* (2006.01)

(52) U.S. Cl. ........................ 709/230; 370/469; 370/235

(58) Field of Classification Search ................. 370/235, 370/469; 709/250
See application file for complete search history.

(56) References Cited

U.S. PATENT DOCUMENTS 5,844,905 A * 12/1998 McKay et al. .............. 370/443
2002/0156927 A1* 10/2002 Boucher et al. ............. 709/250
2003/0223433 A1* 12/2003 Lee et al. ............... 370/395.52
2004/0139220 A1 7/2004 Conley et al.
2005/0122986 A1 6/2005 Starr et al.

FOREIGN PATENT DOCUMENTS

| | | |
|---|---|---|
| JP | 2005-316629 | 11/2005 |
| KR | 1020040056309 | 6/2004 |
| KR | 1020050060801 | 6/2005 |
| KR | 1020050064293 | 6/2005 |

OTHER PUBLICATIONS

Notice of Korean Patent Grant dated Jun. 26, 2007 for the corresponding application KR10-2006-0050043.
Riihijarvi, J., et al., "Providing Network Connectivity for Small Appliances: A Functionally Minimized Embedded Web Server." Oct. 2001. *IEEE Communications Magazine*, vol. 39, No. 10, pp. 74-79.

* cited by examiner

*Primary Examiner*—Huy D Vu
*Assistant Examiner*—Stephen J Clawson
(74) *Attorney, Agent, or Firm*—Ladas & Parry LLP

(57) ABSTRACT

Provided are an apparatus and method for transmitting a packet on Internet Protocol (IP) offload. The apparatus includes: an IP header creating unit for creating an IP header; an Address Resolution Protocol (ARP) request header creating unit for creating an ARP request header; an ARP response header creating unit for creating an ARP response header; a Transmission Control Protocol (TCP) header and data creating unit for creating data and a TCP header; a Media Access Control (MAC) header creating unit for creating an MAC header; a main control unit (MCU) for controlling header creation to transmit a packet; and a cache memory.

4 Claims, 5 Drawing Sheets

23
TCP TRANSMISSION LOGIC
ARP REQUEST HEADER CREATING UNIT
14
22
IP HEADER FIFO
IP HEADER CREATING UNIT
13
24
MULTIPLEXING UNIT
12
MAC HEADER CREATING UNIT
21
HOST PROCESSING UNIT
REGISTER
MCU AND CACHE MEMORY
28
CACHE MEMORY
CACHE CONTROLLER
15
ARP RESPONSE HEADER CREATING UNIT
25
MAC RECEPTION INTERFACE
26
27
11

APPARATUS AND METHOD FOR TRANSMITTING PACKET IP OFFLOAD

FIELD OF THE INVENTION

The present invention relates to an apparatus and method for transmitting a packet on Internet Protocol (IP) offload; and, more particularly, to an apparatus and method for transmitting a packet on IP offload which can quickly transmit a packet in comparison with a structure for using a memory by using a Media Access Control (MAC) header creating unit as a transmission controller of a packet in Transmission Control Protocol (TCP)/IP Offload Engine (TOE) using hardware to accelerate the TCP.

DESCRIPTION OF RELATED ART

Conventionally, a Transmission Control Protocol (TCP)/Internet Protocol (IP) stack is processed in a central processing unit (CPU) of a server as software. However, as a network develops up to a giga-bit level, it is not easy that the CPU processes a large quantity of TCP/IP. It causes a problem that performance of other application programs processed in a host processing unit is deteriorated.

A TCP/IP Offload Engine (TOE) is developed to solve the problem and the TCP/IP are processed in private hardware. The performance of the application program can be improved by reducing the load on a host processing unit through the private hardware processing the TCP/IP.

US Patent Publication No. 2005-0122986 (reference 1) filed by Alacritech Inc., which is famous for a TOE product, discloses a TCP/IP offload device with reduced sequential processing. It suggests using an external static random access memory (SRAM) as a transmission buffer and using an offloading function for IP without being separated from the TCP.

However, there is a problem that the cited reference 1 increases overhead of a processor executing both TCP and IP functions, increases a cost for hardware by using the SRAM and reduces a memory input/output operation speed by using external SRAM.

SUMMARY OF THE INVENTION

It is, therefore, an object of the present invention to provide an apparatus and method for transmitting a packet on Internet Protocol (IP) offload which can quickly transmit a packet by using a Media Access Control (MAC) header creating unit as a packet transmission controller in Transmission Control Protocol (TCP)/IP Offload Engine (TOE) using hardware to accelerate the TCP in comparison with a structure using a memory.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

In accordance with an aspect of the present invention, there is provided a apparatus for transmitting a packet on IP offload, including: an IP header creating unit for creating an IP header; an Address Resolution Protocol (ARP) request header creating unit for creating an ARP request header; an ARP response header creating unit for creating an ARP response header; a Transmission Control Protocol (TCP) header and data creating unit for creating data and a TCP header; a MAC header creating unit for creating an MAC header; a main control unit (MCU) for controlling header creation to transmit a packet; and a cache memory, wherein when the MAC header creating unit receives an IP header creation response signal for TCP/IP packet transmission from the IP header creating unit, the MAC header creating unit transmits the MAC header and requests the IP header creating unit to start transmitting an IP header; when the MAC header creating unit receives an ARP request header creation response for transmitting an ARP request packet from the ARP request header creating unit, the MAC header creating unit transmits the MAC header and requests the ARP request header creating unit to transmit an ARP request header; when the MAC header creating unit receives an ARP reception request from the ARP response header creating unit, the MAC header creating unit requests the ARP response header creating unit to transmit an ARP response header; and when the MAC header creating unit receives an Internet Control Message Protocol (ICMP) creation request from the main control unit, the MAC header creating unit requests the TCP header and data creating unit to transmit an ICMP.

In accordance with another aspect of the present invention, there is provided a method for transmitting a packet in a packet transmitting apparatus on IP offload including a MCU, a cache memory, a MAC header creating unit, an IP header creating unit, an ARP request header creating unit, an ARP response header creating unit, and a TCP header and data creating unit, including the steps of: a) simultaneously transmitting a header creation request for TCP/IP packet transmission from the main control unit to the MAC header creating unit and the IP header creating unit; b) transmitting an IP header creation response notifying that the IP header creating unit starts transmitting a header to the MAC header creating unit; c) when the MAC header creating unit receives an IP header creation response signal for TCP/IP packet transmission from the IP header creating unit, transmitting the MAC header and requesting the IP header creating unit to start transmitting the IP header; d) when the IP header creating unit receives an IP header transmission request from the MAC header creating unit, requesting TCP header transmission to the TCP header and data creating unit; e) when the IP header creating unit receives a response that the TCP header is completely transmitted from the TCP header and data creating unit, transmitting an IP header transmission response to the MAC header creating unit; and f) transmitting a header creation response notifying that the MAC header creating unit completely transmits a TCP/IP packet to the main control unit.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and advantages of the present invention will become apparent from the following description of the embodiments with reference to the accompanying drawings. Therefore, those skilled in the art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
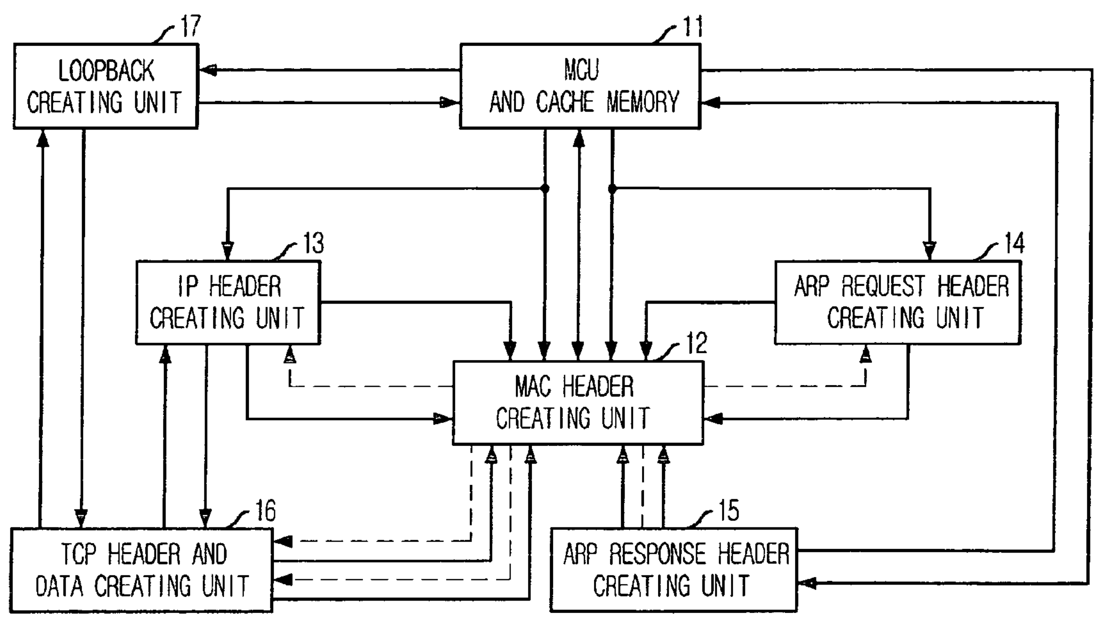
FIG. 1 is a block diagram showing an apparatus for transmitting a packet on Internet Protocol (IP) offload in accordance with an embodiment of the present invention.
Figure 2:
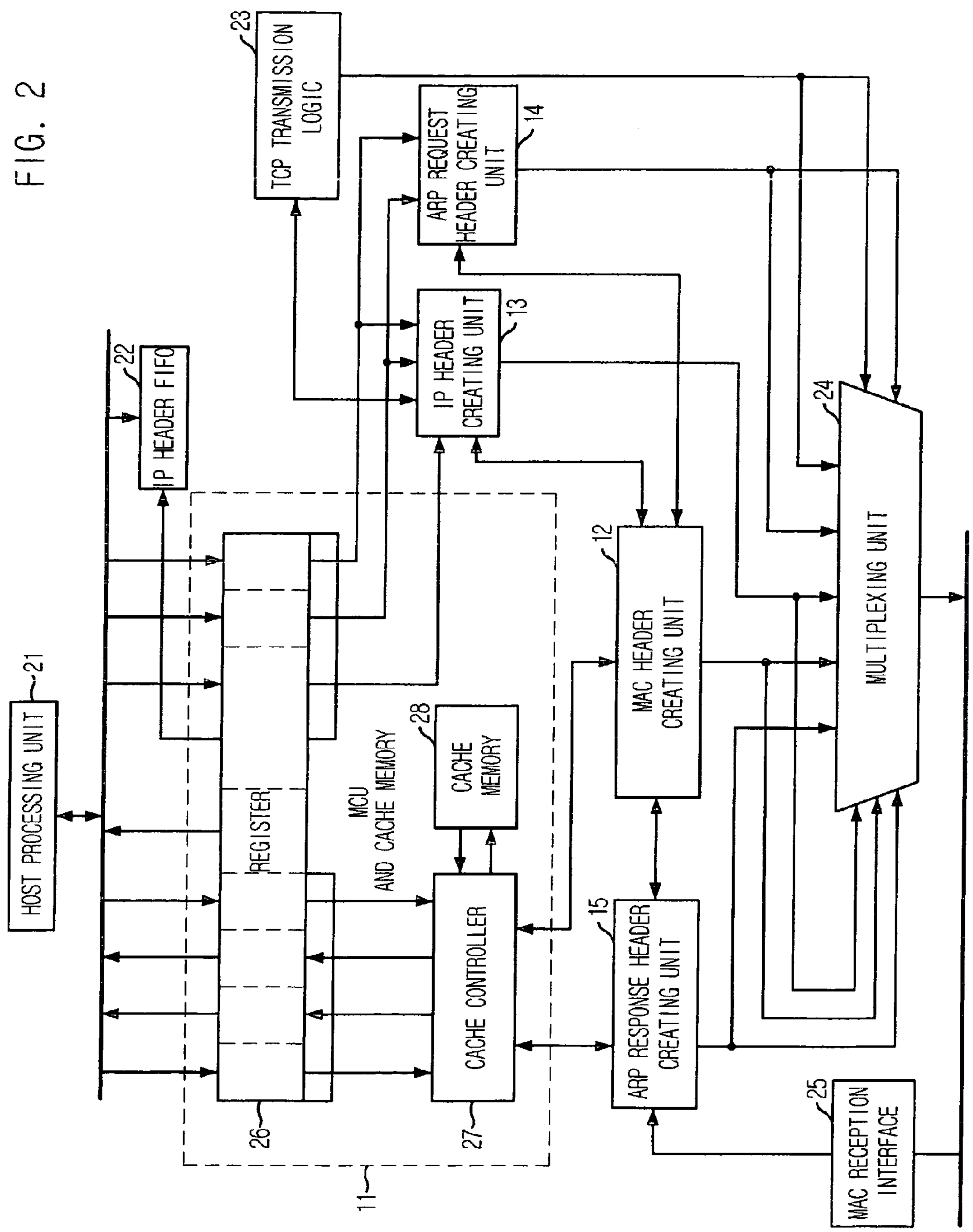
FIG. 2 is a block diagram describing the apparatus for transmitting the packet on IP offload in accordance with the embodiment of the present invention.

FIG. 1 is a block diagram showing an apparatus for transmitting a packet on Internet Protocol (IP) offload in accordance with an embodiment of the present invention and FIG. 2 shows the apparatus for transmitting the packet on IP offload in accordance with the embodiment of the present invention.

In case of Transmission Control Protocol (TCP)/IP, a packet is transmitted in a sequence of a Media Access Control (MAC) header, an IP header, a TCP header and data. In case of Address Resolution Protocol (ARP), the packet is transmitted in a sequence of the MAC header and an ARP header. All packets including Internet Control Message Protocol (ICMP) and a loopback can be transmitted after the MAC header is created. Offloading for an IP function exists as an additional function for a TCP function due to a functional limit by trade-off between a host Central Processing Unit (CPU) and offloading hardware in a current TCP/IP Offload Engine (TOE).

However, the present invention creates other headers excluding the TCP header on each protocol including the ARP, and ICMP protocols and charges a packet transmission function for transmitting the headers. An MAC header creating unit for creating the MAC header functions as a controller in charge of a transmission function. Accordingly, the present invention can quickly and efficiently transmit the packet in comparison with a structure using a conventional memory by creating a first packet, checking whether each header is created and sequentially transmitting the packets to a network interface card (NIC).

Also, the present invention forms a data header according to a command corresponding to each protocol based on a simple memory or a register interface of a processor to reduce a quantity of an embedded processor and perform a fast process. The processor can maximally reduce use of a memory by setting up information on each header as input and creating and transmitting the header within a short time The apparatus for transmitting the packet in the TOE will be described in detail with reference to FIGS. 1 and 2.

When a main control unit and cache memory 11 transmits the TCP/IP packet or an ARP request packet, the main control unit and cache memory 11 simultaneously transmits a header creation request to an MAC header creating unit 12 and an IP header creating unit 13, or an ARP request header creating unit 14 to improve transmission performance. Also, when a loopback packet is transmitted, the main control unit and cache memory 11 requests a loopback creating unit 17 to create the loopback. When an ICMP packet is transmitted, the main control unit and cache memory 11 requests the MAC header creating unit 12 to create the ICMP.

When the MAC header creating unit 12 receives the header creation request from the main control unit and cache memory 11, the MAC header creating unit 12 creates the MAC header. When the MAC header creating unit 12 receives the IP header creation response from the IP header creating unit 13, the MAC header creating unit 12 starts transmitting the MAC header. The MAC header creating unit 12 requests the IP header creating unit 13 to transmit the IP header. Subsequently, when the MAC header creating unit 12 receives the transmission response of the IP header meaning that the IP header is completely transmitted from the IP header creating unit 13, the MAC header creating unit 12 transmits the header creation response meaning that the MAC header is completely transmitted to the main control unit and cache memory 11.

When the MAC header creating unit 12 receives the ARP request header creation response from the ARP request header creating unit 14, the MAC header creating unit 12 transmits the created MAC header and requests the ARP request header creating unit 14 to transmit the ARP request header in the same manner. When the MAC header creating unit 12 receives the ARP request header transmission response by the transmission completion of the ARP request header from the ARP request header creating unit 14, the MAC header creating unit 12 transmits the ARP transmission response to the main control unit and cache memory 11.

When the MAC header creating unit 12 receives the ARP reception request from an ARP response header creating unit 15, the MAC header creating unit 12 creates and transmits the MAC header, and requests the ARP response header creating unit 15 to transmit the ARP response header. Accordingly, the ARP response header creating unit 15 transmits the ARP response header and transmits the ARP reception response to the MAC header creating unit 12.

Also, when the MAC header creating unit 12 receives the ICMP creation request from the main control unit and cache memory 11, the MAC header creating unit 12 creates and transmits the MAC header, and requests the TCP header and data creating unit 16 to transmit the ICMP. When the MAC header creating unit 12 receives the ICMP transmission response from the TCP header and data creating unit 16, the MAC header creating unit 12 transmits the ICMP creation response to the main control unit and cache memory 11.

Meanwhile, when the loopback creating unit 17 receives the loopback creation request from the main control unit and cache memory 11, the loopback creating unit 17 creates and transmits the loopback header, and requests the TCP header and data creating unit 16 to transmit the TCP header. When the loopback creating unit 17 receives the TCP header transmission response from the TCP header and data creating unit 16, the loopback creating unit 17 transmits a loopback creation response to the main control unit and cache memory 11.

The TCP header and data creating unit 16 may be a specific chip for controlling the TCP protocol or a microprocessor unit (MPU). The ARP response header creating unit 15 requests the main control unit and cache memory 11 to update the MAC address received by the ARP request in the cache memory. The MCU and cache memory 11 transmits the update response message to the ARP response header creating unit 15. When TCP/IP packet transmission, ARP packet transmission, and ICMP packet transmission are performed on the MAC header creating unit 12 upon request of the main control unit and cache memory 11, the present invention controls each of the IP header creating unit 13, the ARP request header creating unit 14, the ARP response header creating unit 15, and the TCP header and data creating unit 16.

As describe above, FIG. 2 shows the apparatus for transmitting the packet on IP offload in accordance with an embodiment of the present invention.

A host processing unit 21 communicates with the main control unit and cache memory 11 through a bus. An IP header first-in first-out (FIFO) 22 temporary stores IP header information transmitted through the bus and the stored IP header information is read by the main control unit and cache memory 11.

The main control unit and cache memory 11 includes a cache controller 27, a cache memory 28 and a register 26. The register 26 stores information for communication with the host processing unit 21 and transmits the IP header information read by the IP header FIFO 22 to IP header creating unit 13. Operations of each module are performed according to a value set up in each address of the register 26. The cache controller 27 controls the cache memory 28 and transmits a header creation request to the ARP response header creating unit 15, the ARP request header creating unit 14 and the MAC header creating unit 12.

The cache memory 28 stores a 48-bits register file in an ARP cache table. When a check for determining whether a physical address of the address to be transmitted to the ARP cache table is performed, the IP header is created and transmitted. Since the IP header should receive a maximum of 15 header information of 32-bits word size after the check, processors frequently accesses. A maximum of 16 accesses of the processor is required for one transmission and it causes a minimum of 5 ns*16 delay time on average. To solve the problem, a transmission speed can be improved by storing header information in the IP header FIFO 22 in advance. The delay time is generated by the host interface and it is possible to use other interface instead of the IP header FIFO 22.

A TCP transmission logic 23 is a chip for creating and transmitting the TCP header and data. The MAC reception interface 25 receives an ARP response packet and transmits the ARP response packet to the ARP response header creating unit 15. A multiplexing unit 24 transmits data inputted for individual transmission by an enable signal respectively transmitted from the MAC header creating unit 12, the IP header creating unit 13, the ARP request header creating unit 14, the ARP response header creating unit 15 and the TCP transmission logic 23.

Figure 3:
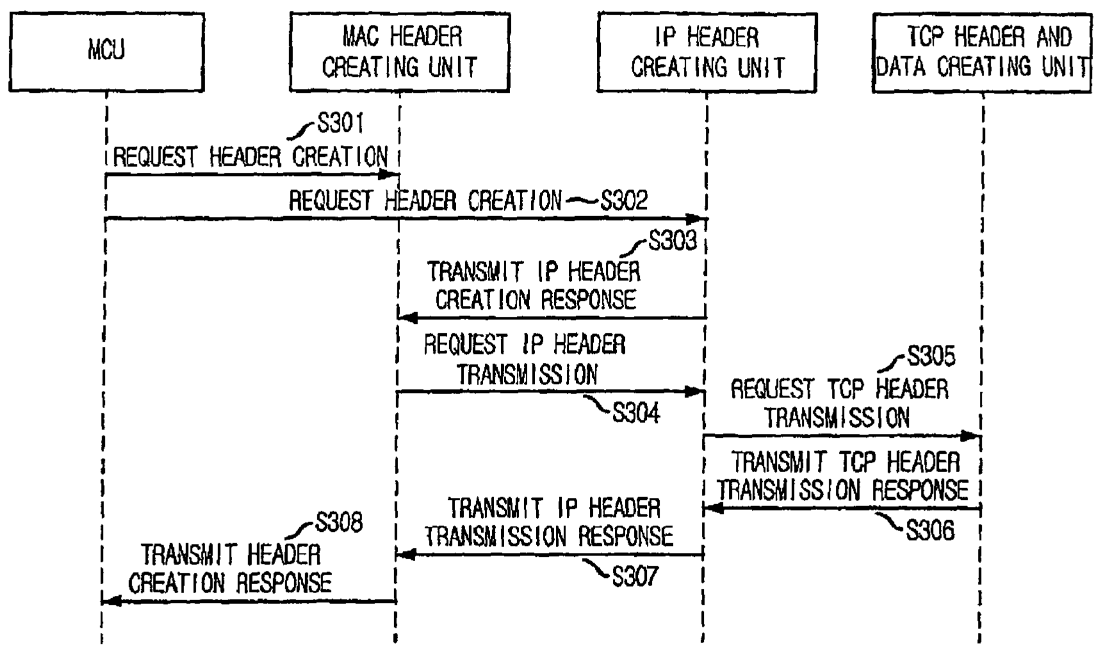
FIG. 3 shows a transmission procedure of a TCP/IP packet in accordance with an embodiment of the present invention.
Figure 4:
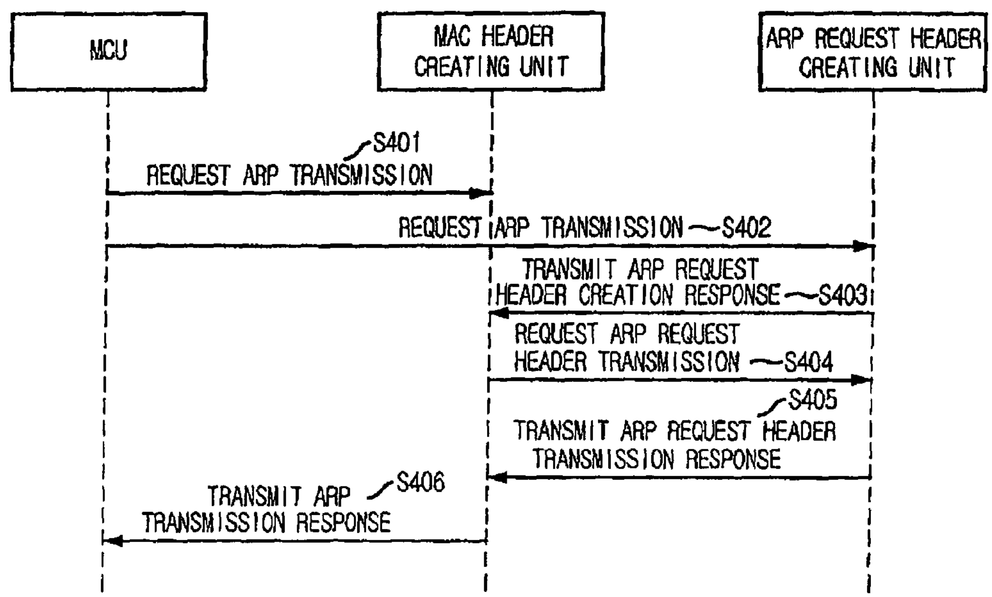
FIG. 4 shows a transmission procedure of an Address Resolution Protocol (ARP) request packet in accordance with the embodiment of the present invention.
Figure 5:
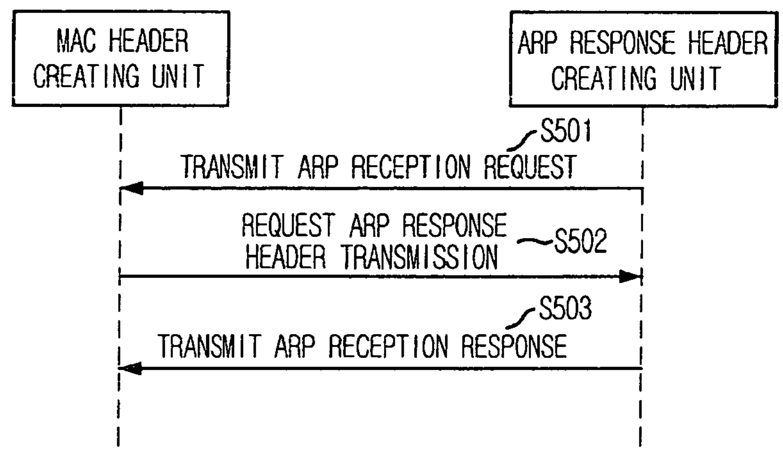
FIG. 5 shows a transmission procedure of an ARP response packet in accordance with the embodiment of the present invention.
Figure 6:
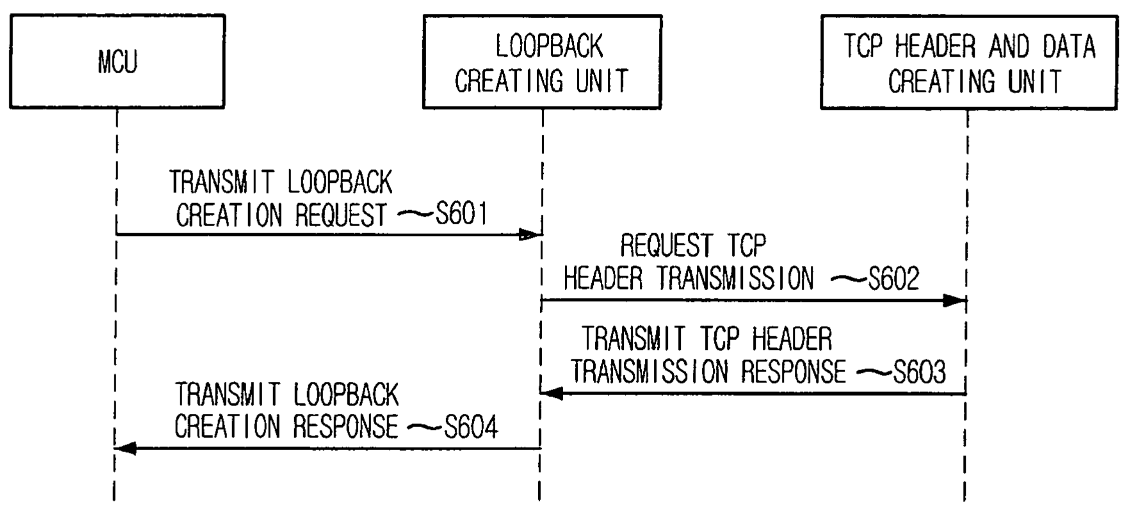
FIG. 6 shows a transmission procedure of a loopback packet in accordance with the embodiment of the present invention.
Figure 7:
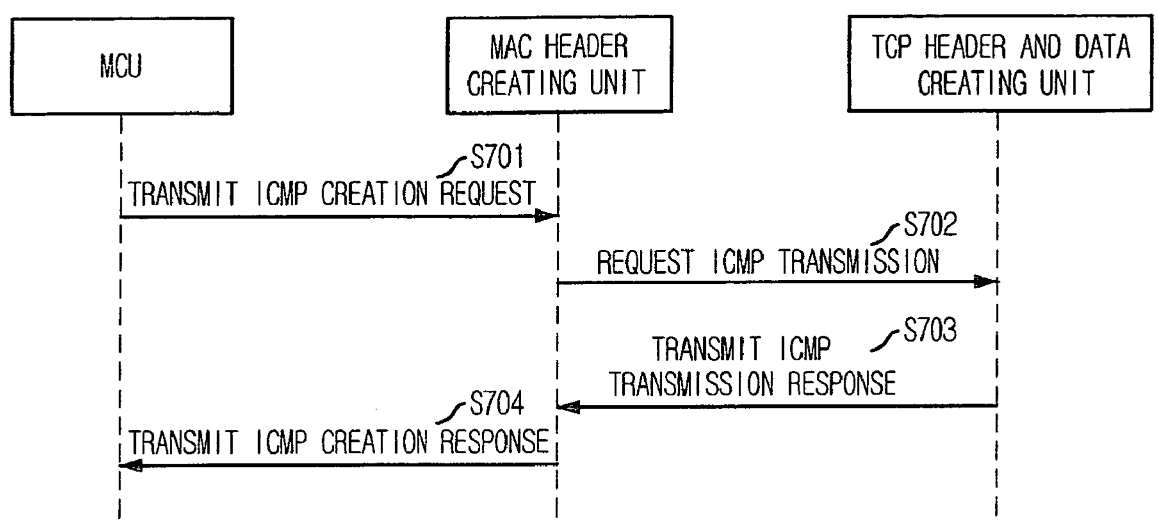
FIG. 7 shows a transmission procedure of an ICMP packet in accordance with the embodiment of the present invention.

FIG. 3 shows a transmission procedure of the TCP/IP packet in accordance with an embodiment of the present invention. FIG. 4 shows a transmission procedure of the ARP request packet in accordance with the embodiment of the present invention. FIG. 5 shows a transmission procedure of the ARP response packet in accordance with the embodiment of the present invention. FIG. 6 shows a transmission procedure of the loopback packet in accordance with the embodiment of the present invention. FIG. 7 shows a transmission procedure of the ICMP packet in accordance with the embodiment of the present invention.

In the transmission procedure of the TCP/IP packet of FIG. 3, the main control unit requests the MAC header creating unit and the IP header creating unit to create a header at steps S301 and S302. The IP header creating unit reads IP information from a register and transmits an IP header creation response to the MAC header creating unit at step S303 in order to start header transmission. The MAC header creating unit transmits the MAC header through the multiplexing unit and requests the IP header creating unit to transmit the IP header at step S304. The IP header creating unit transmits the IP header through the multiplexing unit and requests the TCP header and data creating unit to transmit the TCP header at step S305. The TCP header and data creating unit transmits the TCP header and data through the multiplexing unit and transmits the TCP header transmission response at step S306 to notify that the TCP header is completely transmitted to the IP header creating unit. The IP header creating unit transmits the IP header transmission response to the MAC header creating unit at step S307. The MAC header creating unit transmits the header creation response to the main control unit at step S308 in order to notify that the TCP/IP packet is completely transmitted.

In the transmission procedure of the ARP request packet of FIG. 4, the main control unit requests ARP transmission to the MAC header creating unit and the ARP request header creating unit at steps S401 and S402. The ARP request header creating unit transmits an ARP request header creation response to the MAC header creating unit at step S403 to start header transmission. The MAC header creating unit transmits the MAC header through the multiplexing unit and requests ARP request header transmission to the ARP request header creating unit at step S404 to transmit the ARP request header. The ARP request header creating unit transmits the ARP header through the multiplexing unit and transmits an ARP request header transmission response notifying that the ARP request packet is completely transmitted to the MAC header creating unit at step S405. The MAC header creating unit transmits the ARP transmission response to the main control unit at step S406 in order to notify that the ARP request packet is completely transmitted.

FIG. 5 shows the transmission procedure of the ARP response packet.

In case of the ARP response packet, when a physical layer for the received ARP response packet is received, all procedures are performed. The ARP response header creating unit transmits the ARP reception request to the MAC header creating unit and requests transmission of the ARP response packet at step S501. The MAC header creating unit creates the MAC header, transmits the MAC header through the multiplexing unit and requests ARP response header transmission to the ARP response header creating unit at step S502. The ARP response header creating unit transmits the ARP response header and transmits the ARP reception response to the MAC header creating unit at step S503.

FIG. 6 shows the transmission procedure of the loopback packet.

The main control unit transmits a loopback creation request to the loopback creating unit at step S601 and the loopback creating unit requests TCP header transmission to the TCP header and data creating unit at step S602. The TCP header and data creating unit processes a TCP protocol and transmits a TCP header transmission response to the loopback creating unit at step S603. The loopback creating unit transmits a loopback creation response at step S604 to notify that the loopback packet is completely transmitted to the main control unit.

FIG. 7 shows the transmission procedure of the ICMP packet.

The main control unit transmits an ICMP creation request to the MAC header creating unit at step S701. The MAC header creating unit transmits the MAC header through the multiplexing unit and requests ICMP transmission to the TCP header and data creating unit at step S702. The TCP header and data creating unit performs a TCP process and transmits an ICMP transmission response notifying that the ICMP packet is completely transmitted to the MAC header creating unit at step S703. The MAC header creating unit transmits an ICMP creation response to the main control unit at step S704.

The present invention performs TCP/IP packet transmission, ARP packet transmission, ARP request packet transmission, and ICMP packet transmission on the MAC header creating unit in an engine for offloading TCP/IP. Since the header created by control of the MAC header creating unit is transmitted without individually storing the created header as soon as the header is created differently from a conventional transmitting method using a memory, the present invention can transmit the header fast and save hardware sources.

As described above, the technology of the present invention can be realized as a program and stored in a computer-readable recording medium, such as CD-ROM, RAM, ROM, a floppy disk, a hard disk and a magneto-optical disk. Since the process can be easily implemented by those skilled in the art of the present invention, further description will not be provided herein.

The present application contains subject matter related to Korean patent applications No. 2005-0116131 and No. 2006-0050043 filed with the Korean Intellectual Property Office on Dec. 1, 2005 and Jun. 2, 2006, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for transmitting a packet in a packet transmitting apparatus on Internet Protocol, IP offload including a main control unit, MCU, a cache memory, a Media Access Control, MAC header creating unit, an IP header creating unit, an Address Resolution Protocol, ARP request header creating unit, an ARP response header creating unit, and a Transmission Control Protocol, TCP header and data creating unit, comprising the steps of:

a) simultaneously transmitting a header creation request for TCP/IP packet transmission from the main control unit to the MAC header creating unit and the IP header creating unit;

b) transmitting an IP header creation response notifying that the IP header creating unit starts transmitting a header to the MAC header creating unit;

c) when the MAC header creating unit receives an IP header creation response signal for TCP/IP packet transmission from the IP header creating unit, transmitting the MAC header and requesting the IP header creating unit to start transmitting the IP header, d) when the IP header creating unit receives an IP header transmission request from the MAC header creating unit, requesting TCP header transmission to the TCP header and data creating unit;

e) when the IP header creating unit receives a response that the TCP header is completely transmitted from the TCP header and data creating unit, transmitting an IP header transmission response to the MAC header creating unit; and f) transmitting a header creation response notifying that the MAC header creating unit completely transmits a TCP/IP packet to the main control unit.

2. The method as recited in claim 1, further comprising the steps of:

g) simultaneously transmitting an ARP transmission request for ARP request packet transmission from the main control unit to the MAC header creating unit and the ARP request header creating unit;

h) transmitting an ARP request header creation response notifying that the ARP request header creating unit starts transmitting a header to the MAC header creating unit;

i) when the MAC header creating unit receives an ARP request header creation response from the ARP request header creating unit, transmitting the MAC header and requesting ARP request header transmission to the ARP request header creating unit;

j) when the ARP request header creating unit transmits the ARP request header upon request of the MAC header creating unit, transmitting a response notifying that the ARP request header is completely transmitted to the MAC header creating unit; and k) transmitting an ARP transmission response notifying that an ARP request packet is completely transmitted from the MAC header creating unit to the main control unit.

3. The method as recited in claim 2, further comprising the steps of:

l) when the MAC header creating unit receives an ARP reception request from the ARP response header creating unit, transmitting the MAC header and requesting ARP response header transmission to the ARP response header creating unit; and m) when the ARP response header creating unit transmits an ARP response header upon request of the MAC header creating unit, transmitting a transmission completion response to the MAC header creating unit.

4. The method as recited in claim 3, further comprising the steps of:

n) when the MAC header creating unit receives an Internet Control Message Protocol, ICMP creation request from the main control unit, requesting ICMP transmission to the TCP header and data creating unit; and o) when the MAC header creating unit receives a response notifying transmission completion from the TCP header and data creating unit, transmitting an ICMP creation response to the main control unit.

* * * * *